(12) United States Patent
Georgeson et al.

(10) Patent No.: US 7,633,283 B2
(45) Date of Patent: Dec. 15, 2009

(54) METHOD FOR LIGHTNING STRIKE PROTECTION AND VERIFICATION OF MAGNETIZABLE DIELECTRIC INSERTS

(75) Inventors: Gary E. Georgeson, Federal Way, WA (US); Daniel J. Kovach, Kent, WA (US)

(73) Assignee: The Boeing Company, Chicago, IL (US)

( * ) Notice: Subject to any disclaimer, the term of this patent is extended or adjusted under 35 U.S.C. 154(b) by 471 days.

(21) Appl. No.: 11/174,140

(22) Filed: Jul. 1, 2005

(65) Prior Publication Data

US 2007/0041143 A1 Feb. 22, 2007

(51) Int. Cl.
*G01R 31/02* (2006.01)
(52) U.S. Cl. .......................... 324/72; 324/173; 324/179
(58) Field of Classification Search .................. 324/72, 324/663, 117 H
See application file for complete search history.

(56) References Cited

U.S. PATENT DOCUMENTS

| | | | |
|---|---|---|---|
| 3,655,595 A | * | 4/1972 | Higashi ....................... 525/533 |
| 4,502,092 A | | 2/1985 | Bannink, Jr. et al. |
| 4,707,048 A | | 11/1987 | Gliha et al. |
| 4,747,789 A | | 5/1988 | Gliha |
| 5,208,697 A | * | 5/1993 | Schaffner et al. ............ 359/254 |
| 5,389,875 A | * | 2/1995 | Rosen et al. ................. 324/228 |
| 5,706,572 A | * | 1/1998 | Garshelis ................... 29/602.1 |
| 6,392,600 B1 | * | 5/2002 | Carson et al. ......... 343/700 MS |
| 2003/0210027 A1 | | 11/2003 | Pedigo et al. |
| 2003/0212489 A1 | | 11/2003 | Georgeson et al. |
| 2007/0177330 A1 | * | 8/2007 | Ackerman et al. .......... 361/220 |
| 2008/0307886 A1 | * | 12/2008 | Marsh et al. .................. 73/601 |

* cited by examiner

Primary Examiner—Thomas F. Valone
(74) Attorney, Agent, or Firm—Alston & Bird LLP

(57) ABSTRACT

An apparatus, system, and method for lightning strike protection and verification are provided. In one embodiment, the apparatus includes at least one fastener extending through both the structure and substructure to secure the structure and substructure together. The apparatus also includes an insert disposed between the substructure and at least a portion of the fastener, where the insert includes dielectric and magnetizable material such that the insert is capable of reducing the incidence of sparking between at least one component associated with the fastener and the substructure.

12 Claims, 4 Drawing Sheets

METHOD FOR LIGHTNING STRIKE PROTECTION AND VERIFICATION OF MAGNETIZABLE DIELECTRIC INSERTS

BACKGROUND OF THE INVENTION

1) Field of the Invention

The present invention relates to dielectric inserts and, more particularly, to dielectric inserts that are verifiable and used for lightning strike protection between a structure and a substructure.

2) Description of Related Art

Competition in the commercial aircraft industry has created demand for higher performance aircraft with lower manufacturing and operating costs. To meet this demand, new materials (such as composite materials) and fabrication processes must be evaluated and applied to new designs. Although composite materials have been used on a number of military and commercial aircraft in non-fuel areas, the use of composite materials for fuel filled (a.k.a., wet) composite primary structure poses a significant lightning strike concern and change in aircraft design philosophy and certification. Lightning protection is, and has been, a certification requirement for over 30 years. The vast majority of legacy commercial aircraft designs have been based on use of aluminum as the primary airframe material. Aluminum is an excellent electrical and thermal conductor and provides a tremendous amount of inherent lightning protection. Relatively inexpensive, low impact design criteria have been successfully applied to aluminum-based platforms to obtain safe structural, fuel tank, and system designs with known certification approaches. Composite structures, which have a diminished capacity for carrying electrical current relative to aluminum, are far more susceptible to damage from lightning strike attachments.

Because composite aerospace structures are susceptible to lightning strike damage, research has been focused on lightning strike protection (LSP). The protection approaches are aimed at either protecting surfaces (especially load-carrying surfaces) from excessive damage or puncture, or aimed at enabling the safe transport of current between attachment points. This is particularly important when currents are conducted through fuel-containing areas like wing fuel tanks. The risk from uncontrolled transport of current is that certain geometries are prone to developing sparks above geometry-specific threshold levels (threshold is defined as the lowest value of the peak current of a transient lightning pulse at which arcing or sparking is seen to occur). One such geometry involves mechanically fastened skin-substructure joints where exposed fastener heads can conduct high currents from the airplane exterior into metallic substructures. For these geometries, the sparking threshold can be quite low (on the order of 5000 amps), due mainly to the interface between fastener collars/nuts and metal surfaces.

To improve sparking in these geometries, it has been determined that by electrically isolating the collars from the metal substructure with a dielectric insert the spark threshold can be raised substantially. Ten times or greater improvement in threshold values have been achieved.

Dielectric inserts have additional requirements to meet in addition to the ability to withstand high electrical currents without breakdown. Some of these requirements include the ability to transfer compressive loads between collars and the substructure, the ability to withstand long-term fuel exposure, and the ability to be inspectable and unable to be inadvertently removed or substituted during collar installation (either during initial assembly or in-service). These requirements are necessary because when an insert is not properly placed between the collar and substructure, protection against arcing/sparking is nonexistent. Similarly, if a non-dielectric insert (e.g., a conductive metallic insert) is inadvertently substituted for the dielectric insert, then lightning strike protection is also circumvented.

Various approaches for development of a dielectric insert meeting the necessary requirements have been considered and developed. These approaches include dielectric washers, insulative coatings, and bonded glass/epoxy layers. These approaches suffer from a number of problems. For example, hard insulative coatings can be scratched or penetrated inadvertently during assembly operations. Dielectric washers suffer from being relatively easy to be substituted for or to be not installed in the first place. In addition, there is the risk of substituting a dielectric washer for a metallic washer during maintenance/repair operations. To avoid the risk of inadvertent non-installation, bonded composite (e.g., glass/epoxy) dielectric inserts have also been considered. However, bonded glass/epoxy lamina inserts require expensive and time consuming bonding operations, and are also somewhat susceptible to damage during assembly, including damage due to collar installation. Their ability to withstand cyclic loading over the lifetime of the aircraft is also unreliable.

With all dielectric insert approaches, convenient/economical verification of the inserts' presence in the structure is highly recommended. The primary problem with all of the previous isolation approaches is that they cannot be verified to be in existence without extremely inconvenient and time consuming manual visual inspections of a structure, such as the inside of the fuel tank. Such inspections can be further hindered by the presence of fuel sealant covering the regions requiring inspection.

It would therefore be advantageous to provide an insert that is capable of being non-destructively located and verified. In addition, it would be advantageous to provide an inspection system that is portable and capable of inspecting structures to verify the presence of dielectric sensors. It would also be advantageous to provide a non-destructive inspection system that is effective and economical to manufacture and use.

BRIEF SUMMARY OF THE INVENTION

Embodiments of the invention address the above needs and achieve other advantages by providing an apparatus for lightning strike protection between a structure and a substructure, while also providing a system and method for verifying that an insert is present for lightning strike protection between the structure and substructure. The insert includes magnetic material that allows a magnetic sensor to determine whether the insert is present. Thus, the inserts are verifiable by the magnetic sensor to ensure that the inserts are present to reduce the incidence of sparking resulting from lightning striking the structure.

In one embodiment, an apparatus for providing lightning strike protection between a substructure and a structure is provided. The apparatus includes at least one fastener extending through both the structure and substructure to secure the structure and substructure together. The apparatus also includes an insert disposed between the substructure and at least a portion of the fastener, where the insert includes dielectric and magnetizable material such that the insert is capable of increasing the sparking threshold between at least one component associated with the fastener and the substructure.

In various aspects of the apparatus, the insert extends circumferentially about, and at least partially along a length of, at least one fastener. The insert could also extend substantially between the structure and the collar. The insert is capable of accommodating a plurality of fasteners and may include a magnetically loaded epoxide. The insert may be permanently magnetized, or may be capable of being magnetized and demagnetized. The component could be a collar that is secured to a respective fastener such that the fastener and collar cooperate to secure the structure and substructure together.

Embodiments of the present invention also provide a system for verifying lightning strike protection between a structure and a substructure. The system includes a fastening apparatus having at least one fastener extending through each of the structure and substructure to secure the structure and substructure together. The fastening apparatus also includes an insert disposed between the substructure and at least a portion of the fastener, wherein the insert includes dielectric material such that the insert is capable of increasing the sparking threshold between at least one component associated with the fastener and the substructure. The system further includes a sensor positioned proximate to the structure and operable to verify the presence of the insert within the fastening apparatus.

In aspects of the system, the insert further includes a magnetizable material. As before, the fastening apparatus may further include at least one collar secured to a respective fastener for securing the structure and substructure together. The sensor could be a magnetic sensor, such as a Hall-effect sensor or a magnetometer. The magnetic sensor is typically operable to measure an axial magnetic field strength of the insert. The system could further include a data acquisition system that is in communication with the magnetic sensor. The data acquisition system is capable of communicating with the magnetic sensor such that the data acquisition system creates an image of the magnetic field acquired by the magnetic sensor. In addition, the sensor is generally positioned proximate to an outer surface of the structure and may be manually or automatically operable.

Another embodiment of the present invention provides a method for verifying lightning strike protection between a structure and a substructure. The method includes positioning a magnetic sensor proximate to the structure, where the structure is secured to the substructure by at least one fastener. The method further includes measuring a magnetic field with the magnetic sensor to determine whether a dielectric insert is positioned between the substructure and at least one component associated with the fastener.

In additional aspects of the method, the method includes measuring an axial magnetic field strength of the dielectric insert. The method could also include positioning a magnetic sensor proximate to an outer surface of the structure. Furthermore, the method may include manually or automatically scanning the magnetic sensor along the outer surface of the structure. The method could further include generating an image of the magnetic field. In addition, the method could include magnetizing the dielectric insert prior to measuring the magnetic field of the insert, and/or demagnetizing the dielectric insert after measuring the magnetic field of the insert.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
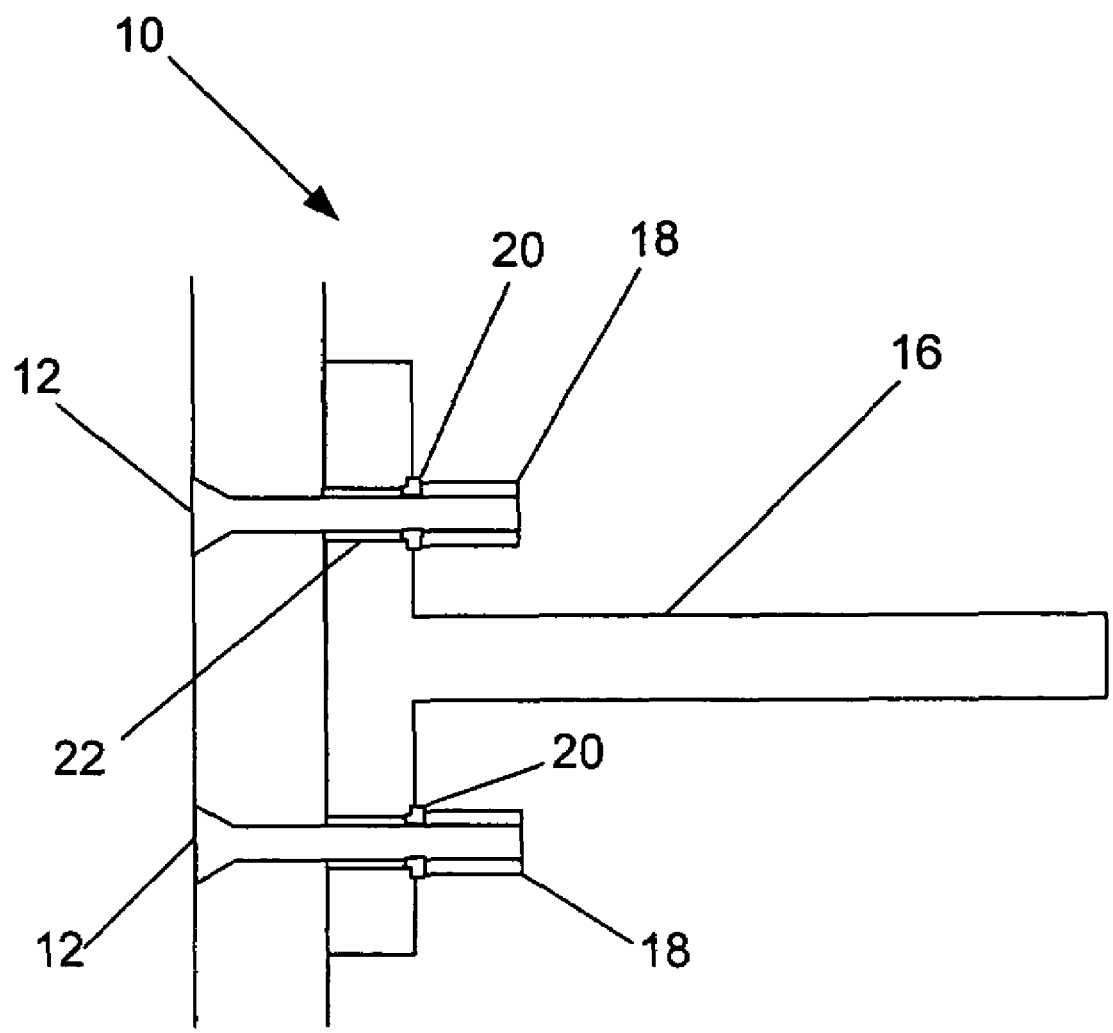
FIG. 1 is a cross-sectional view of an apparatus for electrically isolating a substructure from a structure, according to one embodiment of the present invention.

Referring now to the drawings and, in particular to FIG. 1, there is shown a fastening apparatus 10. The fastening apparatus 10 includes fasteners 12 extending through a structure 14 and substructure 16. A collar 18 is threaded on an end of a respective fastener 12 to secure the structure 14 and substructure 16 together. An insert 20 is positioned between the collar 18 and substructure 16 to provide lightning strike protection between the structure 14 and substructure. As will be explained in further detail below, an inspection system 100 is provided for verifying the presence of the inserts 20 to ensure that the collar 18 is less prone to generate sparks as a result of lightning striking the structure 14. The inspection system 100 could be used to inspect any number of structures 14 and substructures 16 in a variety of industries where detection of the inserts 20 is required, such as in the aircraft, automotive, or construction industries.

The term "structure" is not meant to be limiting, as the structure 14 could be any number of parts or structures of different shapes and sizes, such as machined forgings, castings, or composite parts. The structure 14 could be a newly manufactured structure or an existing structure that is secured to the substructure 16. However, the structure material is typically a metallic or composite material and is conductive or at least semi-conductive. For example, the structure could be carbon-epoxy or aluminum. In addition, the structure material could be a thin material that is used, for instance, as aircraft skin. Similarly, the term "substructure" is not meant to be limiting, as the substructure 16 could be any substructure that is capable of being secured to the structure and supporting or otherwise reinforcing the structure 14. For example, the substructure 16 could be an angular member or a shear tie, as shown in FIG. 1, that is formed in a T-shaped configuration for receiving further reinforcement members, such as spars or ribs. The substructure 16 is generally formed of an electrically conductive material.

The fasteners 12 extend through holes 22 defined in each of the structure 14 and substructure 16. The fasteners 12 are generally of sufficient length to extend through the structure 14 and substructure 16 and partially beyond the substructure so that a collar 18 may be secured on the end of a respective fastener.

Figure 2:
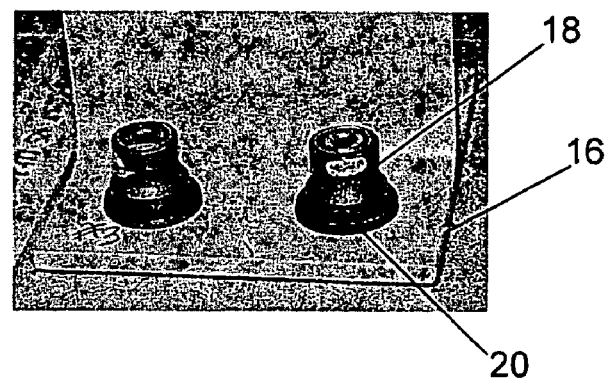
FIG. 2 is a perspective view of the apparatus shown in FIG. 1.

FIG. 2 illustrates that the substructure 16 includes a T-shaped configuration, where a pair of fasteners 12 extends on both sides of the unsecured portion of the substructure. In addition, the outer surface of the structure 14 typically includes a countersink for accommodating the head of each of the fasteners 12 such that the fastener head aligns flush with the outer surface of the structure 14. The fasteners 12 are typically fabricated from an electrically conductive material, such as titanium. Although four fasteners 12 for securing the structure 14 and substructure 16 are shown, it is understood that there may be any number and configuration of fasteners that are capable of securing the structure and substructure together.

Each collar 18 threads onto a respective fastener 12 to secure the structure 14 and substructure 16 together. In addition, each collar 18 is typically threaded or otherwise secured on an end of a fastener 12 and lies proximate to the substructure 16 when fully secured. FIG. 2 illustrates an exemplary pair of collars 18. Like the fasteners 12, the collars 18 are typically fabricated from electrically conductive material, such as titanium or stainless steel. Moreover, the collar 18 should not be limited to that shown in FIGS. 1 and 2, as the collar could be various configurations to accommodate a particular fastener 12 and ensure that the structure 14 and substructure 16 are adequately secured.

An insert 20 is positioned between a portion of each fastener 12 and the substructure 16. In addition, the insert 20 is further disposed between the substructure 16 and a respective collar 18. In this regard, the inserts 20 are positioned between the substructure 16 and collar 18 and include a sufficient width such that the substructure and collar do not contact one another. For example, as shown in FIGS. 1 and 2, each insert 20 is configured as a washer such that the insert extends circumferentially about a respective fastener 12. However, the inserts 20 could be various sizes and configurations in additional aspects of the present invention. Thus, the inserts 20 could also be configured to extend both circumferentially about a respective fastener 12 and further along the length of the fastener than the illustrated washer. For example, the inserts 20 could extend substantially between the structure 14 and a respective collar 18. Thus, the inserts 20 could extend substantially through a respective hole 20 defined in the substructure 16. Furthermore, the inserts 20 may be configured as a strip to accommodate multiple fasteners 12. Therefore, a single insert 20 may be used for a pair of adjacent fasteners 12 or a single substructure 16, where several fasteners are employed to secure to the structure 14 and substructure together. Similarly, a single insert 20 could be used to accommodate more than one substructure 16 with each substructure having a plurality of fasteners 12. In an additional aspect of the present invention, the inserts 20 could be configured as a collar or nut that engages the fastener 12, thereby eliminating the need for both an insert and a collar 18.

Each insert 20 includes dielectric material. Thus, the inserts 20 are capable of reducing sparking between the substructure 16 and a fastener 12 and a respective collar 18, which in effect, increases the sparking threshold. However, it is understood that the inserts 20 could also reduce sparking between the fastener 12 and the substructure 16 if a collar 18 is not required. In addition, the inserts 20 could also reduce sparking between other components in addition to the collar 18. For instance, there could be various components, such as nuts, retainers, washers, pins, clips, or electronics, secured to the substructure 16 that could generate sparks as a result of a lightning strike to the structure 14.

Moreover, each insert 20 also includes magnetizable material such that the inserts are capable of being magnetized and demagnetized. Providing magnetizable material facilitates the location and verification of the presence of inserts 20 during installation or inspection, as will be explained in further detail below. An example of suitable material for the inserts 20 includes Eccosorb® MF (Emerson and Cuming, Inc.), which is a rigid magnetically loaded epoxide stock. The material of the inserts 20 could also be homogeneous and isotropic. It is understood that the term "magnetizable" is not meant to be limiting, as the inserts 20 may be permanently magnetized in additional aspects of present invention. As described above, the term magnetizable also includes inserts 20 that may be magnetized and demagnetized.

Figure 3:
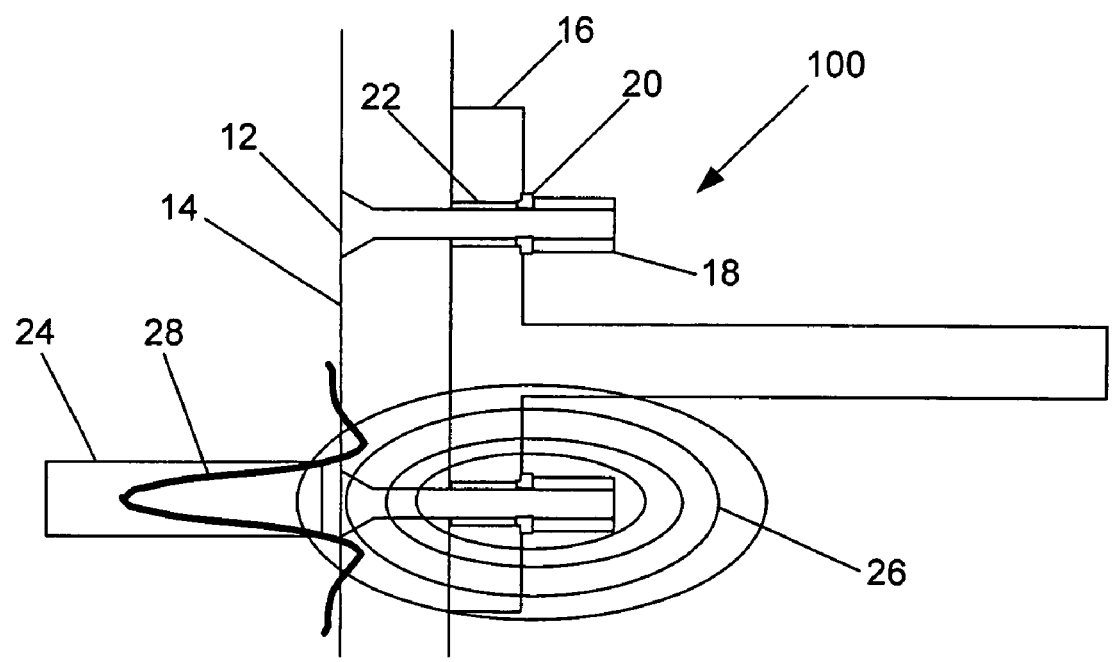
FIG. 3 is a cross-sectional view of a system for inspecting the apparatus shown in FIG. 1, according to one embodiment of the present invention.

FIG. 3 illustrates an inspection system 100 that includes a magnetic sensor 24 positioned proximate to an outer surface of the structure 14. Because the inserts 20 include magnetic material and are magnetizable, the inserts may generate a magnetic field 26 when magnetized that is detectable by the magnetic sensor 24. The magnetic sensor 24 detects an axial magnetic field strength 28 (if an insert 20 is present) at the outer surface of the structure 14 to locate and verify that an insert has been installed at that particular location. However, it is understood that the magnetic sensor 24 is capable of measuring various components of the magnetic field strength 28 other than the axial magnetic field strength.

The magnetic sensor 24 could be any suitable sensor or probe capable of detecting the magnetic field strength 28 of the inserts 20. The magnetic sensor 24 is typically a non-destructive sensor, such that the sensor is capable of inspecting the structure 14 without harming the structure or requiring disassembly of the structure. In the embodiment of the inspection system 10 shown in FIG. 1, the magnetic sensor 24 is a Hall Effect-based sensor or other type of magnetometer.

The magnetic sensor 24 could be used manually or automatically to locate and verify the presence of inserts 20. Thus, a technician could hold the magnetic sensor 24 and position the sensor proximate to the outer surface of the structure 14 to inspect a portion of the structure or the entire structure if desired. In addition, the magnetic sensor 24 could be placed on a scanning head that automatically scans the outer surface of the structure 14. Although only a single magnetic sensor 24 is shown, it is understood that there could be one or more magnetic sensors in various aspects of the present invention. In addition, the magnetic sensor 14 may have various sensitivities and accuracy depending on the insert 20 utilized as long as the insert is capable of being properly located and verified.

Figure 4:
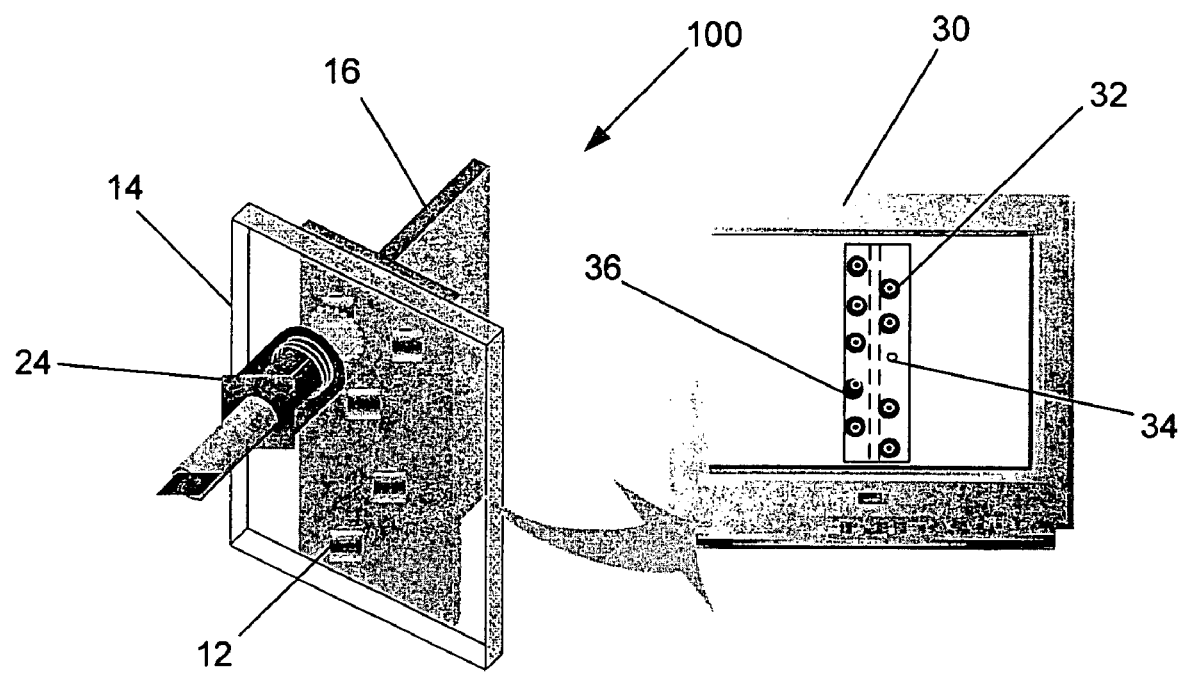
FIG. 4 is a system for inspecting the apparatus shown in FIG. 1 and generating a graphical image, according to another embodiment of the present invention.

FIG. 4 demonstrates that a magnetic sensor 24 may be scanned to generate a 2-D image of the magnetic field strength 28. The magnetic sensor 24 is in communication with a data acquisition system 30 to process the data accumulated by the magnetic sensor and to display the processed data. Providing an image of the scan allows the shape, size, and condition of the inserts 20 to be analyzed. For instance, FIG. 4 illustrates that several fasteners 12 were scanned and shows that the data acquisition system 30 generates an image 32 for each respective insert 20. FIG. 4 further demonstrates that there is a missing insert 34, as well as an installation problem 36 where a fastener 12 and insert are misaligned.

In many cases, communications cable(s) transmit data between the magnetic sensor 24 and the data acquisition system 30. In other embodiments, the data may be transmitted between the magnetic sensor 24 and the data acquisition system 30 via wireless communications. The magnetic sensor 24 may be directly connected to the data acquisition system 30, or indirectly connected, such as via a network. In further embodiments of the present invention the data acquisition system 30 may be located proximate to the magnetic sensor 24, such that remote connections between the magnetic sensor and data acquisition system are not necessary.

The data acquisition system 30 typically includes a processor or similar computing device operating under the control of imaging software so that the magnetic field strength 28 may be presented on a display. It is possible to incorporate the data acquisition system 30 without a display and to instead provide a printout of the image scan, or to utilize any other technique for viewing the scan and location data. The processor could be embodied by a computer such as a desktop, laptop, or portable processing device capable of processing the data generated by the magnetic sensor 24 and creating an image of the scanned data that is shown on a display such as a monitor or other viewing device, as shown in FIG. 4. The data acquisition system 30 generates images of the scans and may also allow a user to store and edit previously created images. Therefore, a permanent record of the images may be kept for future use or record keeping.

Figure 5:
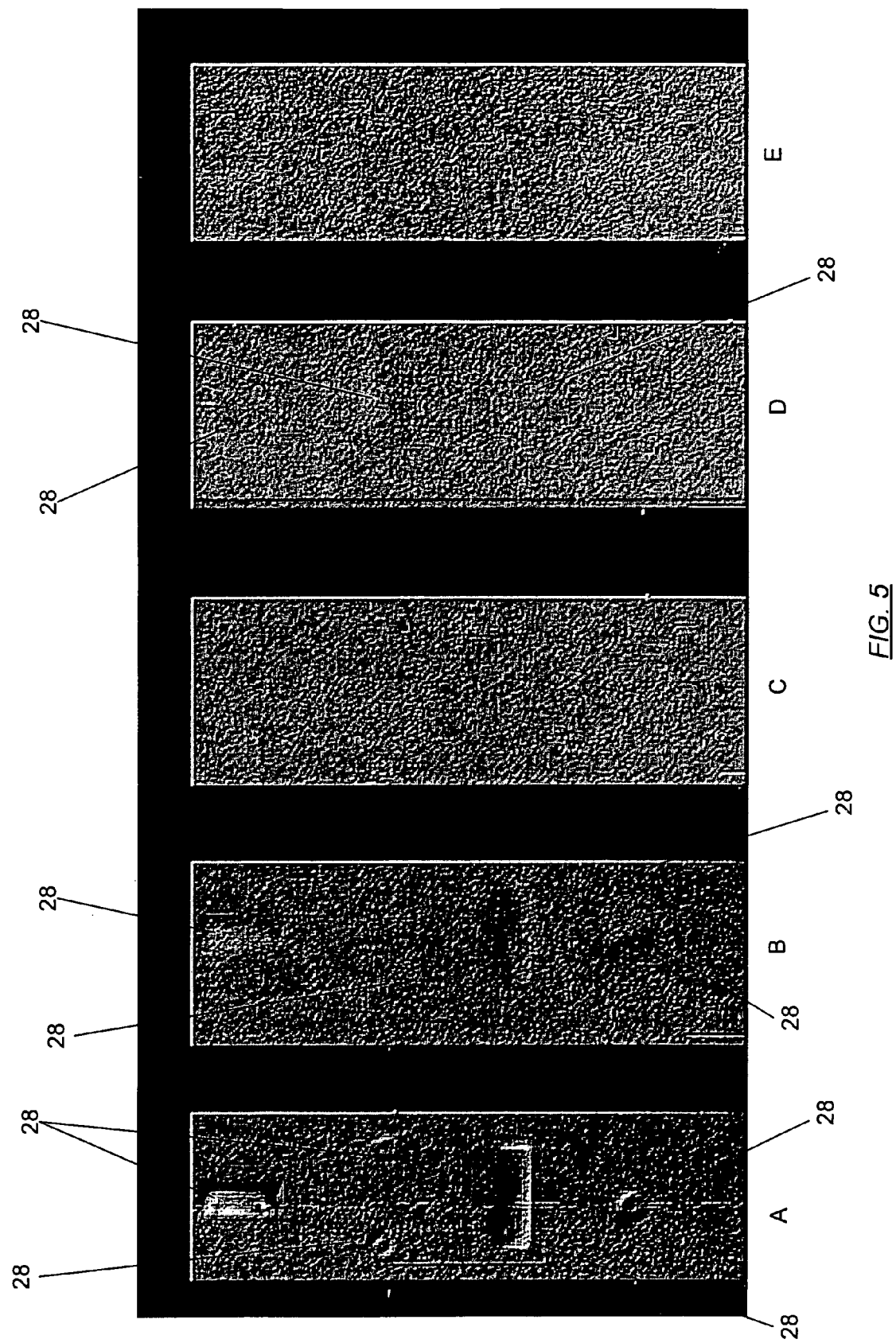
FIGS. 5A-E are graphical images generated by an inspection system, according to one embodiment of the present invention.

FIG. 5 depicts a further example of images of magnetic field strength 28 generated by a data acquisition system 30. The sample images shown demonstrate magnetic field strength 28 of inserts 20 for various thicknesses of structural panels. For instance FIG. 5A shows an image of a 0.04 inch panel, where the panel and inserts 20 have been magnetized and a magnetic field strength 28 is represented for each insert. Thus, FIG. 5A shows that the inserts 20 may be rectangular and accommodate more than one fastener 12 or circular and accommodate a single fastener. FIG. 5B illustrates an image of a 0.2 inch panel, where the panel and inserts 20 have been magnetized and includes magnetic field strength 28 for each insert, although the magnetic field strength shown is not as distinct as that shown in FIG. 5A. Therefore, the magnetic field strength 28 decreases as the thickness of the panel increases. FIG. 5C shows a 0.2 inch panel that has been pre-magnetized. Moreover, FIG. 5D depicts the 0.2 inch panel and inserts 20 magnetized from an outer surface of the panel (i.e., magnetized on an opposite surface from where the inserts are located), while FIG. 5E illustrates the 0.2 inch panel and inserts demagnetized from the outer surface of the panel. Thus, by demagnetizing the structural panel and the inserts 20, the magnetic sensor 24 is unable to locate or verify the presence of the inserts.

Therefore, embodiments of the present invention provide several advantages. For instance, the inserts 20 not only reduce sparking between metallic substructures 16 and collars 18, but are also easy and convenient to determine if the inserts are properly located. The inserts 20 may be verified to be in existence without inconvenient and time consuming manual and visual inspections of the inside of the substructure, such as near a fuel tank. Furthermore, providing magnetizable inserts 20 allows the inserts to be magnetized during inspection and demagnetized after inspection such that the inserts will not be prone to attract magnetic materials or debris.

In addition, embodiments of the present invention allow for both production and in-service (even on the flight-line) validation of electrical isolation between the structure 14 and substructure 16. Furthermore, two separate and distinct failure mechanisms may be incorporated to ensure that an insert 20 is present for a respective fastener 12. First, any technician performing fastener replacement activities would have to violate clear maintenance protocol in order to replace the insert 20 with an inappropriate insert or not install an insert when installing a collar 18. Additionally, if an in-service inspection for the presence of the inserts 20 could be conveniently and economically mandated, the inspection would have to be negligently performed for a failure in the inspection to occur. Thus, two separate and distinct operations by two organizations would have to occur in order to have a loss of lightning protection at a particular fastener 12 location. Thus, the installation and inspection of magnetic-dielectric inserts 20 is inherently a robust lightning protection scheme for composite structures 14.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for verifying lightning strike protection by determining the presence of a dielectric insert comprising magnetizable material positioned between a structure and a substructure, said method comprising:

positioning a magnetic sensor proximate to the structure, the structure secured to the substructure by at least one fastener; and measuring a magnetic field generated by the dielectric insert with the magnetic sensor to determine whether the dielectric insert is positioned between the substructure and at least one component associated with the fastener in order to verify lightning strike protection between the structure and substrate.

2. The method according to claim 1, wherein measuring comprises measuring an axial magnetic field strength of the dielectric insert.

3. The method according to claim 1, wherein positioning comprises positioning the magnetic sensor proximate to an outer surface of the structure.

4. The method according to claim 3, further comprising manually scanning the magnetic sensor along the outer surface of the structure.

5. The method according to claim 1, further comprising generating an image of the dielectric insert represented by the measured magnetic field.

6. The method according to claim 1, further comprising magnetizing the dielectric insert such that the dielectric insert generates a measurable magnetic field prior to measuring the magnetic field of the dielectric insert.

7. The method according to claim 6, further comprising demagnetizing the dielectric insert after measuring the magnetic field of the dielectric insert such that the dielectric insert does not generate a measurable magnetic field.

8. The method according to claim 1, further comprising automatically scanning the magnetic sensor along the outer surface of the structure.

9. The method according to claim 5, wherein measuring comprises measuring the magnetic field of a plurality of dielectric inserts, and wherein generating comprises generating an image of the dielectric inserts each represented by a respective measured magnetic field.

10. The method according to claim 5, further comprising determining at least one of a shape or a size of the dielectric insert based on the image.

11. The method according to claim 5, further comprising determining a condition of the dielectric insert based on the image.

12. The method according to claim 5, further comprising determining a location of the dielectric insert based on the image.

* * * * *

UNITED STATES PATENT AND TRADEMARK OFFICE
CERTIFICATE OF CORRECTION

PATENT NO. : 7,633,283 B2 Page 1 of 1
APPLICATION NO. : 11/174140
DATED : December 15, 2009
INVENTOR(S) : Georgeson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 745 days.

Signed and Sealed this

Ninth Day of November, 2010

David J. Kappos
*Director of the United States Patent and Trademark Office*